(12) United States Patent
Freeman et al.

(10) Patent No.: US 6,388,806 B1
(45) Date of Patent: *May 14, 2002

(54) UPGRADABLE, GAIN FLATTENED FIBER AMPLIFIERS FOR WDM APPLICATIONS

(75) Inventors: Paul N. Freeman, Saratoga, CA (US); Stephen G. Grubb, Columbia, MD (US); Daniel A. Ratoff, San Jose; David G. Mehuys, Sunnyvale, both of CA (US)

(73) Assignee: SDL, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/797,043

(22) Filed: Feb. 28, 2001

Related U.S. Application Data

(63) Continuation of application No. 09/252,713, filed on Feb. 19, 1999, now Pat. No. 6,236,498.
(60) Provisional application No. 60/075,744, filed on Feb. 23, 1998, provisional application No. 60/075,621, filed on Feb. 20, 1998, and provisional application No. 60/075,385, filed on Feb. 20, 1998.

(51) Int. Cl.[7] ................................................ H01S 3/00
(52) U.S. Cl. .................................. 359/341.3; 359/341.1
(58) Field of Search ........................... 359/341.1, 341.3, 359/124, 345

(56) References Cited

U.S. PATENT DOCUMENTS

| | | | |
|---|---|---|---|
| 5,323,404 A | 6/1994 | Grubb | 372/6 |
| 5,430,572 A | 7/1995 | Digiovanni et al. | 359/341 |
| 5,485,481 A | 1/1996 | Ventrudo et al. | 372/6 |
| 5,668,821 A | 9/1997 | Hodgson et al. | 372/6 |
| 5,673,280 A | 9/1997 | Grubb et al. | 372/3 |
| 5,715,263 A | 2/1998 | Ventrudo et al. | 372/6 |
| 5,900,969 A | * 5/1999 | Srivastava et al. | 359/341 |
| 6,236,498 B1 | * 5/2001 | Freeman et al. | 359/341 |

FOREIGN PATENT DOCUMENTS

| | | |
|---|---|---|
| EP | 0 392 493 A1 | 10/1990 |
| EP | 0 621 663 A1 | 10/1994 |
| EP | 0 647 000 A1 | 4/1995 |
| EP | 0 695 050 A1 | 1/1996 |
| EP | 0 782 225 A2 | 7/1997 |
| EP | 0 789 432 A1 | 8/1997 |
| EP | 0 859 480 A2 | 8/1998 |
| JP | WO 96/29627 | 9/1996 |

OTHER PUBLICATIONS

Wysocki et al., "Broad–Band Erbium–Doped Fiber Amplifier Flattened Beyond 40 nm Using Long–Period Grating Filter" IEEE Photonics Technology Letters, vol. 9, No. 10, Oct. 1, 197, pp. 1343–1345.

Park, et al, "Three State Erbium–Doped Fiber Amplifier for Wide Dynamic Range and Low Noise Figure", Optical Fiber Communication, Summaries of Papers Presented at the Conference OFC 95, San Diego, Feb. 26–Mar. 3, 1995, Feb. 26, 1995, pp. 171–172.

Masuda et al., "Wideband, gain–flattened, erbium–doped fibre Amplifiers with 3dB bandwidths of >50nm", Electronics Letters, vol. 33, No. 12, Jun. 5, 1997, pp. 1070–1072.

* cited by examiner

*Primary Examiner*—Mark Hellner
(74) *Attorney, Agent, or Firm*—Allen, Dyer, Doppelt, Milbrath & Gilchrist, P.A.

(57) ABSTRACT

A multistage optical fiber amplifier (OFA) system is designed to be upgraded with the addition of pump power when signal capacity of an optical communication link is correspondingly increased. The system includes a gain flattening filter (GFF) that remains valid when the system is upgraded because of the system design. Also disclosed are ways to enhance the GFF as well as control the channel signal gain tilt as well as adjust the external gain uniformity to be the same for an assembly line of OFA systems.

16 Claims, 6 Drawing Sheets

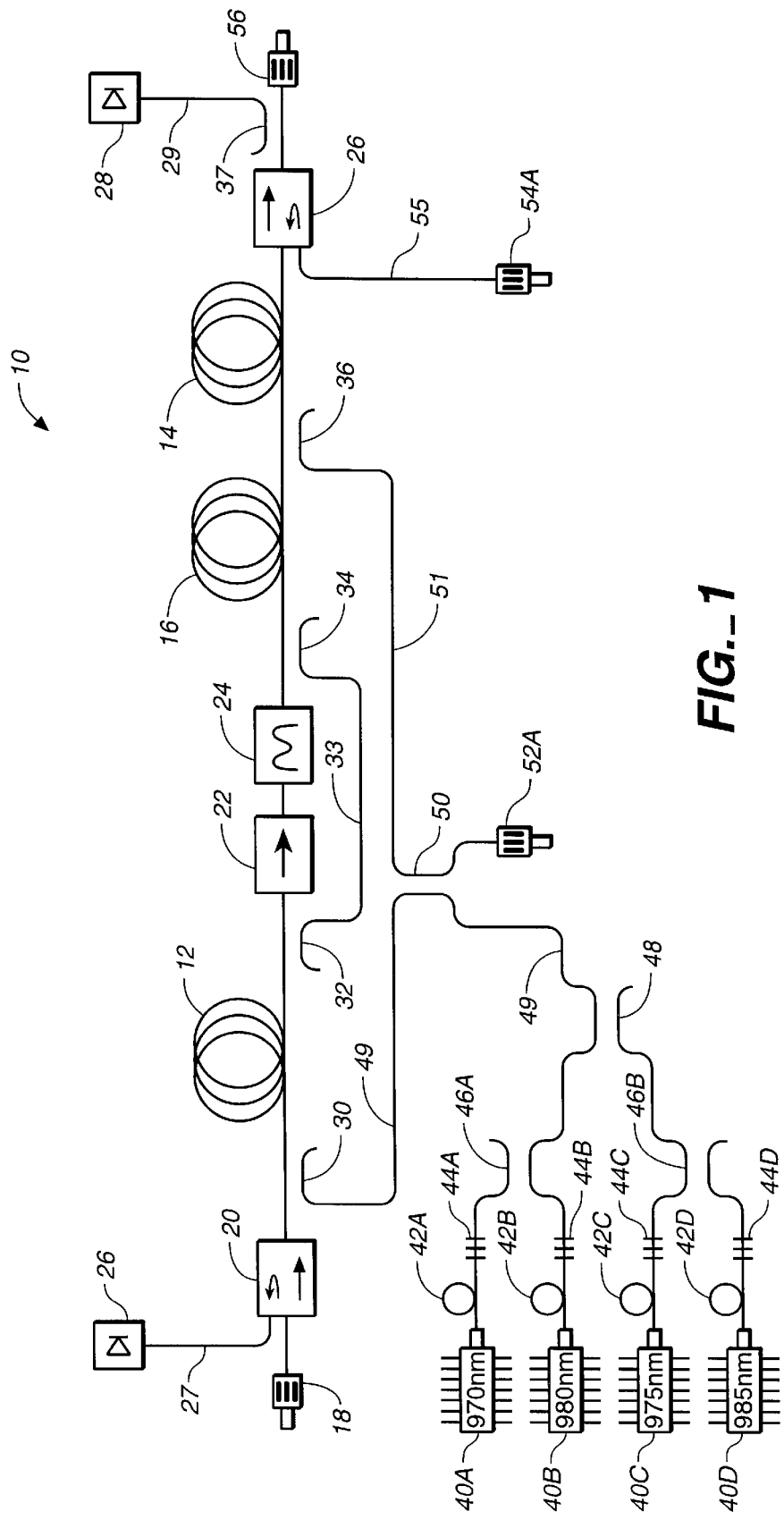
FIG._1

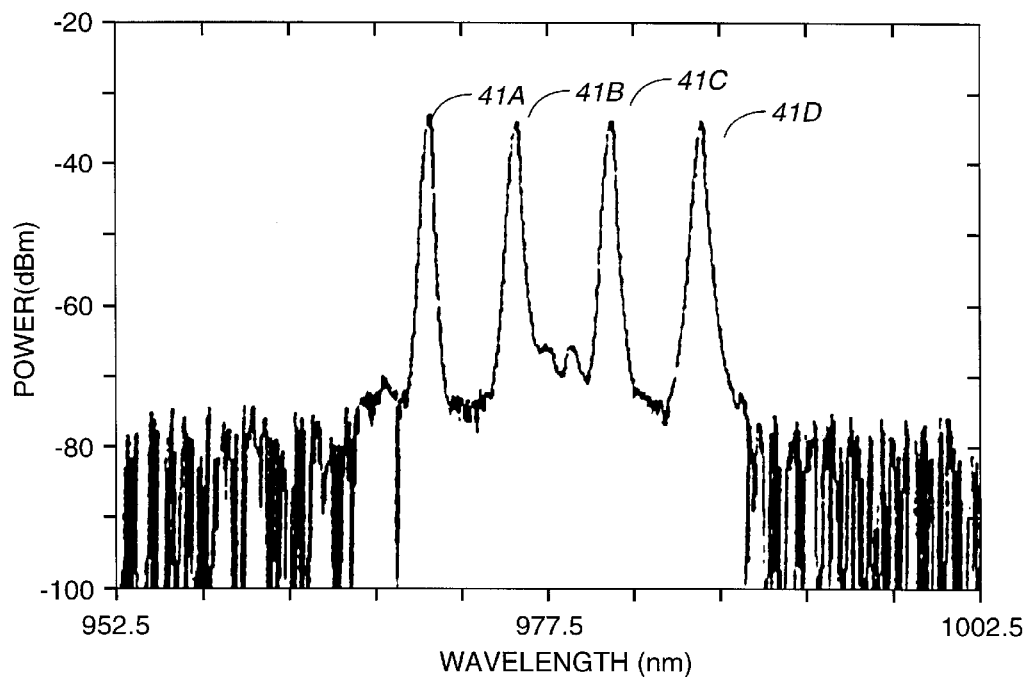
FIG._2
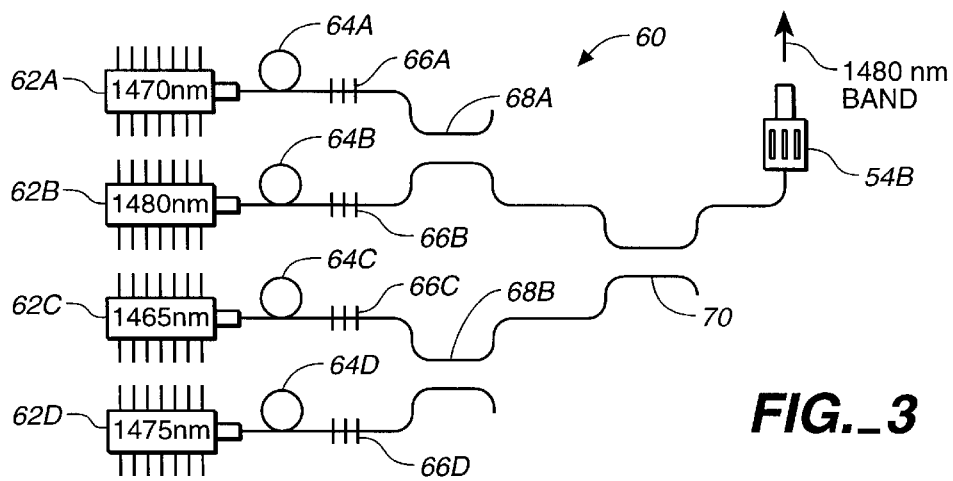
FIG._3
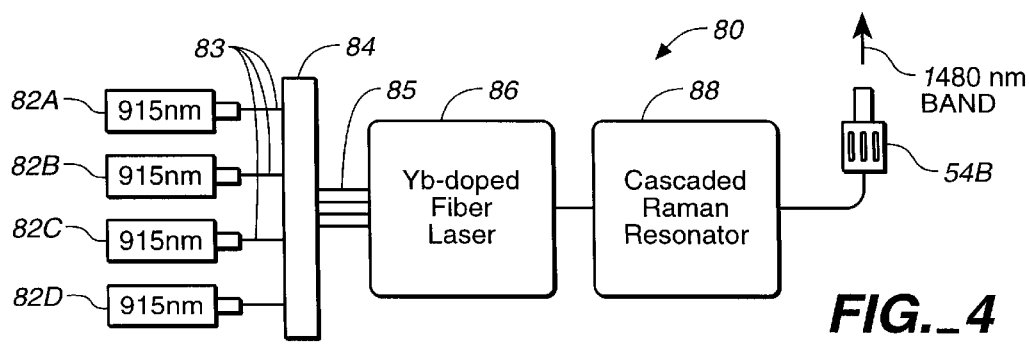
FIG._4

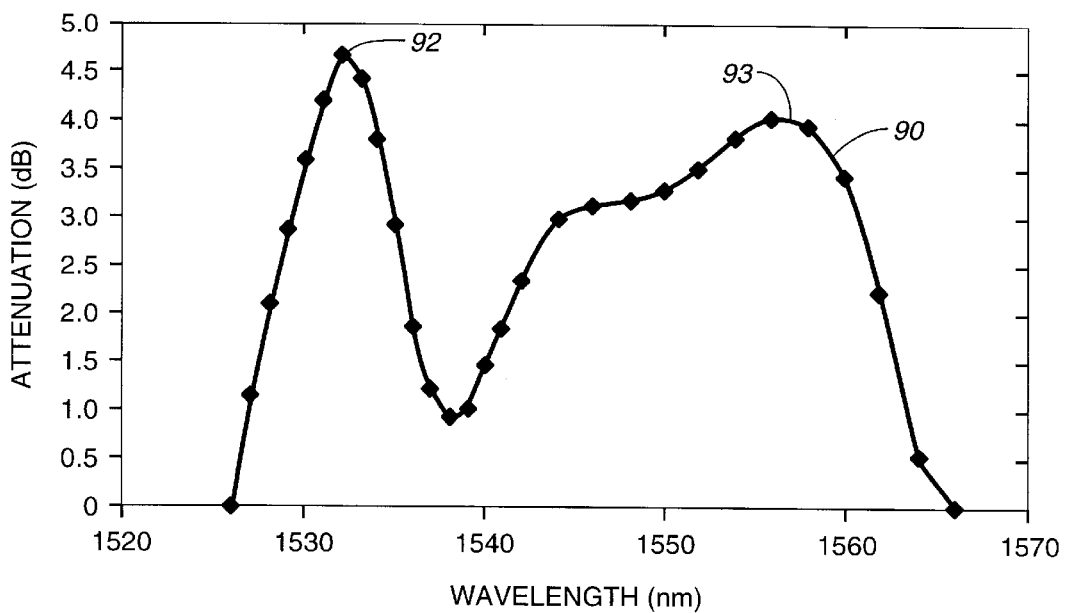
FIG._5
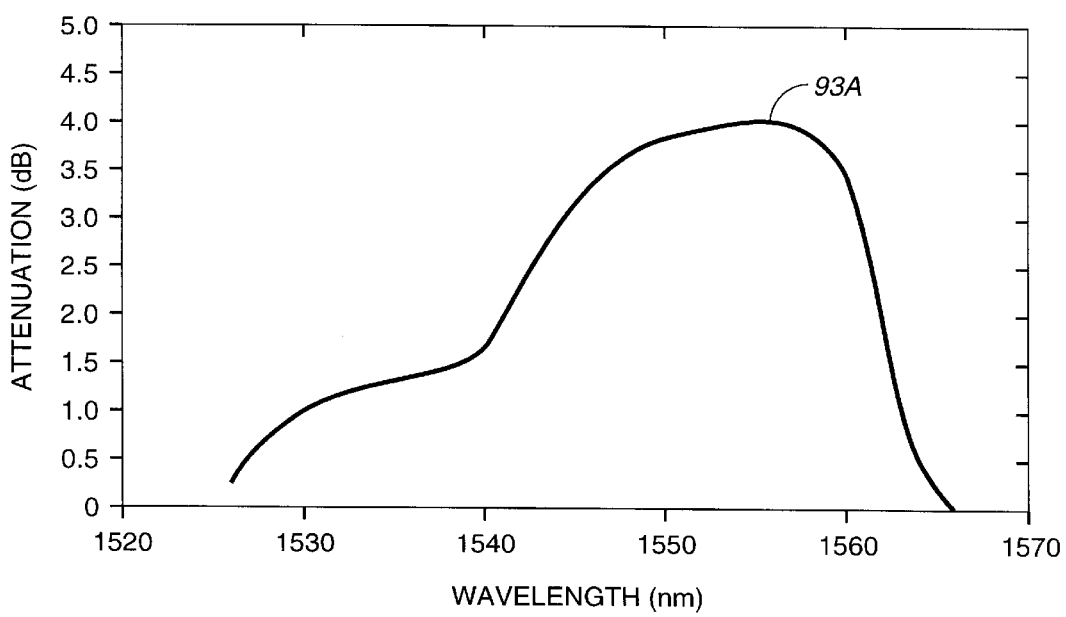
FIG._5A

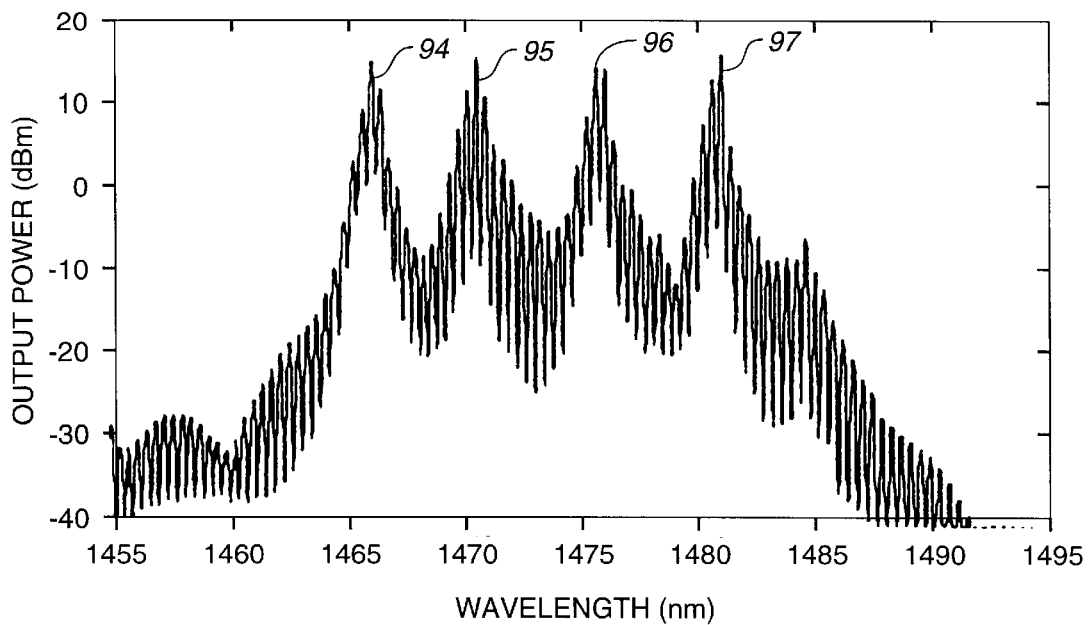
FIG._6
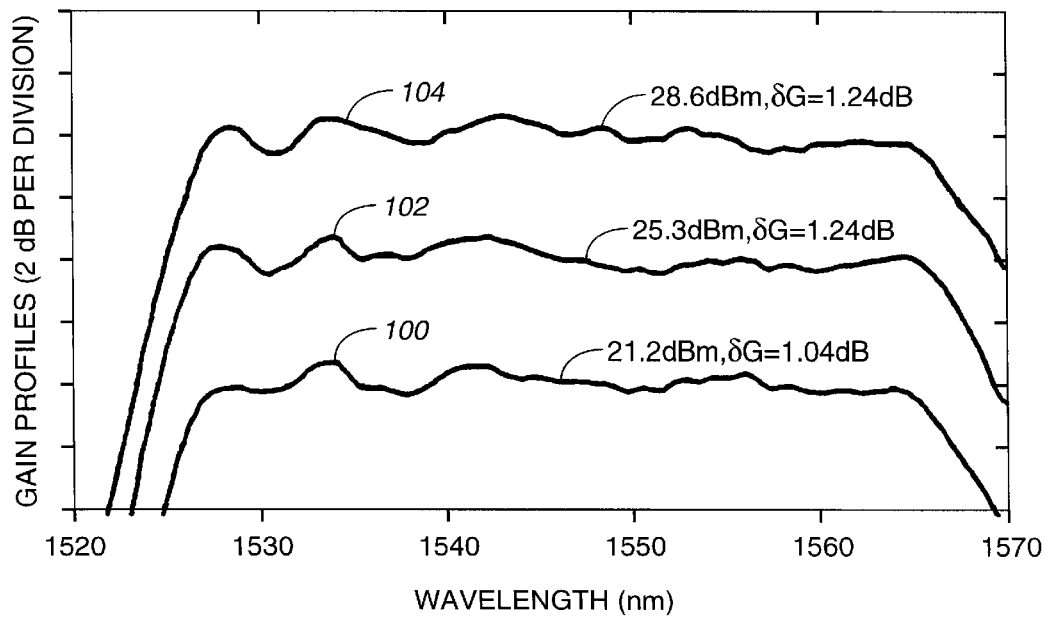
FIG._7

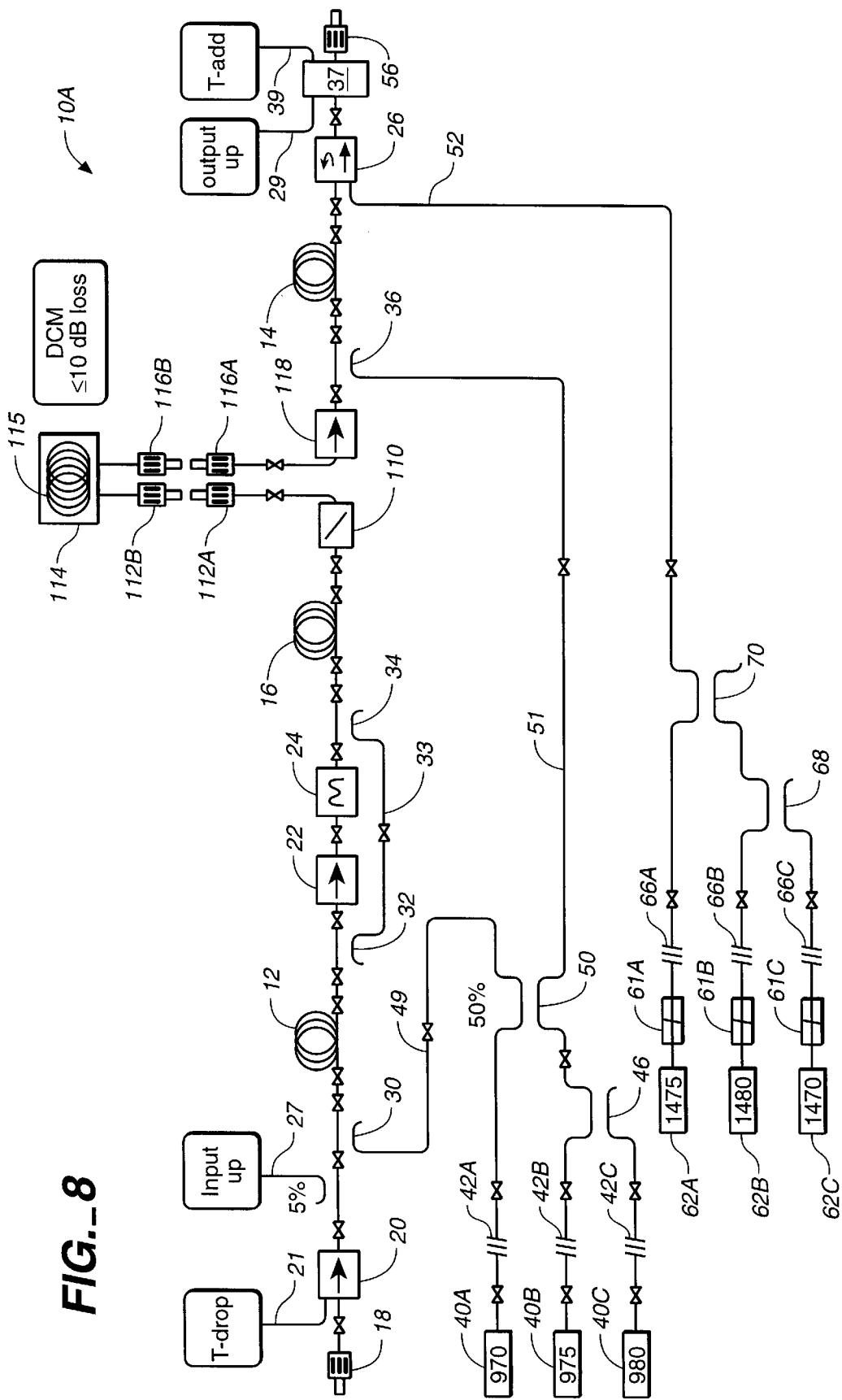
FIG._8

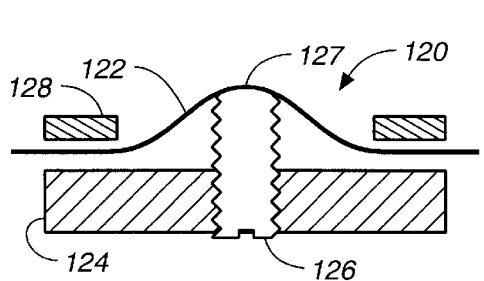
FIG._9
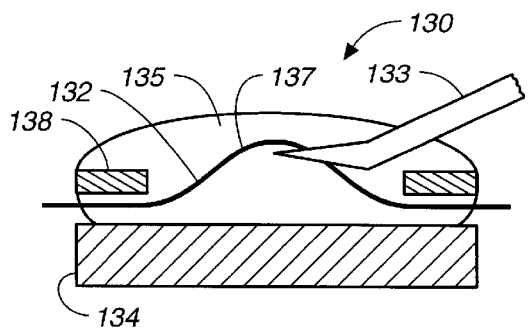
FIG._10
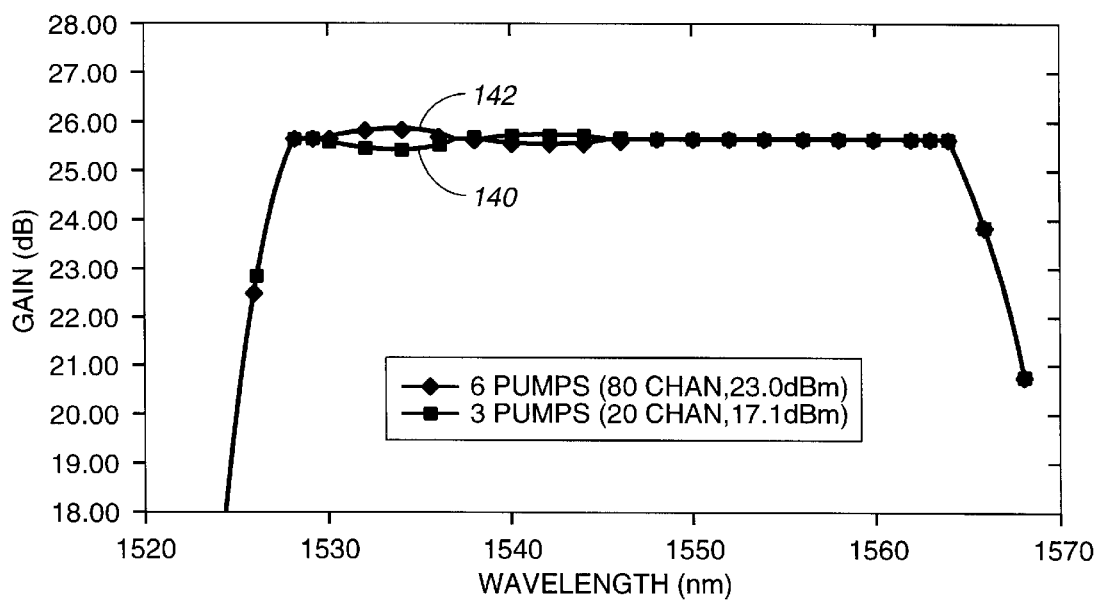
FIG._11

US 6,388,806 B1

UPGRADABLE, GAIN FLATTENED FIBER AMPLIFIERS FOR WDM APPLICATIONS

REFERENCE TO RELATED APPLICATION

This application is a continuation of Ser. No. 09/252,713 filed Feb. 19, 1999, now U.S. Pat. No. 6,236,498 which claimed priority benefits of prior filed provisional patent application Ser. No. 60/075,621, filed Feb. 20, 1998; Ser. No. 60/075, 385, filed Feb. 20, 1998 and 60/075,744, filed Feb. 23, 1998, all of which are incorporated herein by their reference.

FIELD OF THE INVENTION

This invention relates generally to fiber amplifiers for WDM or DWDM systems and more particularly to improvements in gain flatness in such systems and designed for their future upgradability in power output and signal channel capability.

BACKGROUND OF THE INVENTION

Wavelength division multiplexing (WDM) or dense WDM (DWDM) communication systems increase the transmission capacity of an optical fiber in a communication system by combining several optical signals with different wavelengths. To render these systems practical, optical amplifiers must meet tight requirements for providing gain uniformity over all channel signal wavelengths. Since the intrinsic gain spectrum of a rare earth doped fiber amplifier is highly non-uniform, some method of flattening the gain profile of the amplifier must be implemented. The gain profile of the fiber amplifier, however, is complicated by other factors as well. The gain profile of a rare earth doped optical fiber amplifier OFA), such as an erbium doped fiber amplifier (EDFA), is determined by the average inversion level of the erbium ions in the erbium doped fiber. This inversion level is a function of the power level of the signal or signals to be amplified and the applied power levels of the pump sources. If the signal power is sufficiently lower than the applied pump power, the fiber will maintain close to 100% inversion and the signal gain and the amplifier gain profile will not appreciably change with changes in input signal powers. However, as signal powers increase, the signal gain in the amplifier becomes limited by the availability of pump power for the fiber amplifier, i.e., output signal power is, of course, limited by the available pump power and the signal input power levels. OFA's usually operate with their gain fibers saturated because this provides for optimum pump to signal power conversion. When the gain of the amplifier is "saturated", the inversion level, amplifier gain, and the gain profile of the amplifier all become strongly dependent on the ratio of signal to pump powers. The standard manner of maintaining constant gain flatness with changes in input power levels is to actively change the pump power to all OFA stages of the system in order to maintain constant signal to pump power ratios. There is a need, therefore, to provide a WDM amplifier system with flexibility to provide a commercially viable way to provide for maintenance of constant pump to signal ratios without redesigning the amplifier system. It is good to accomplish this by increasing the pump power but this must be done without saturating the input amplifier stage of the system, also referred to as the pre-amplifier; otherwise, the noise figure is materially affected.

While much progress has been made in achieving wide bandwidth gain flattened OFA systems, such as the system illustrated in Masuda et al., "Wideband, Gain-Flattened, Erbium-Doped Fibre Amplifier With 3 dB Bandwidths of >50 nm", *Electronic Letters*. Vol. 33(12), pp. 1070–1072, Jun. 5, 1997, the achievement of higher output powers required to make these systems more practical have not achieved much attention as well as optimization and adjustability of the gain flattening characteristics of the system.

In providing additional pump power, it is desired that the OFA system lend itself to be easily adaptability to power upgradability, allowing customers to purchase a lower capacity amplifier system and, later, upgrade the system to increase system capacity with increasing communication demands while providing the same output gain per channel and no significant change in system noise figure.

Therefore, it is an object of this invention to provide a multistage fiber amplifier system that is field upgradable in pump power and channel capacity.

It is another object of this invention to provide a multistage fiber amplifier system that is upgradable to higher output power levels and increase in channel capacity while maintaining uniform signal output per channel.

A further object of this invention to provide an upgradable multistage fiber amplifier system that allows a wide variation in possible external gain configurations while employing the same interstage gain equalizer continually maintaining uniform amplifier gain flattening in spite of changes to the pump power and signal channel capacity to the base multistage amplifier system.

SUMMARY OF THE INVENTION

According to this invention, a multistage fiber amplifier system for primary use in optical communication links comprises a pre-amp input optical fiber amplifier (OFA) stage and a power output optical fiber amplifier (OFA) stage and includes a gain flattening filter (GFF) is field upgradable in pump power and channel capacity while maintaining substantially the same signal power to pump power ratio when upgraded so that the characteristics of the gain flattening filter remain applicable to the upgraded system. An important factor in achieving such upgradability is that in the case of either the basic system configuration or in the upgraded configuration, a high inversion state, i.e., the inversion in the input stage of the system is maintained as high as practical or close to 100%. This can be accomplished more easily by fabricating a short fiber input stage with excess pump power in the input stage provided to bypass the gain flattening filter and launched into the output power amplifier stage. Also, the pump power is provided via an optical split coupler to provide pump power to both the input and output OFA stages. Upon system upgrade with added pump power, the additional pump power can be provided through an input connector to the optical coupler. With pump power upgrade, a proportionately amount of increase in pump power will be provided to the input and output OFA stages.

Also, disclosed are ways to enhance the gain flattening filter attenuation profile as well as ways to adjust and control the uniformity of the external gain tilt and the external gain level of the amplified channel signals in mass production of the multistage amplifier systems.

These and other features of the invention are expressed in further detail in the description and discussion of the redundant pumping scheme and its application to a lightwave communication system as illustrated in the accompanying drawings.

BRIEF DESCRIPTION OF THE DRAWINGS

FIG. 1 is a schematic illustration of first embodiment of this invention comprising an upgradable, gain flattened, multistage fiber amplifier system providing for co-propagating and counter-propagating pump upgrades.

FIG. 2 a schematic illustration of the output spectrum of wavelength multiplexed, co-propagating pump lasers at λ=978±8 nm in FIG. 1.

FIG. 3 a schematic illustration of a first upgradable pump module for the amplifier system of FIG. 1.

FIG. 4 a schematic illustration of a second upgradable pump module for the amplifier system of FIG. 1.

FIG. 5 is a graphic illustration of the attenuation profile of the gain flattening filter shown in the amplifier system of FIG. 1.

FIG. 5A is a graphic illustration of the attenuation profile of a modified gain flattening filter.

FIG. 6 is a graphic illustration of the output spectrum of the DWDM combined upgradable pump module of FIG. 3.

FIG. 7 is a graphic illustration of the gain profiles of the base amplifier system configuration shown in FIG. 1 and as upgraded with the upgradable pump modules shown in FIG. 3.

FIG. 8 is a schematic illustration of second embodiment of this invention comprising an upgradable, gain flattened, multistage fiber amplifier system with means to adjust the external gain of the system to meet end user requirements.

FIG. 9 is a schematic illustration of another embodiment of this invention for adjusting the external gain of the system of FIG. 8.

FIG. 10 is a schematic illustration of further embodiment of this invention for adjusting the external gain of the system of FIG. 8.

FIG. 11 is a graphic illustration of modeled gain profiles for a 20 channel version and an 80 channel version of the system of FIG. 8.

DESCRIPTION OF THE PREFERRED EMBODIMENTS OF THE INVENTION

Reference is now made to FIG. 1 illustrating the basic multistage fiber amplifier system 10 comprising this invention. System 10 comprises an input or pre-amplifier stage 12 and an output or power amplifier stage 14. Additional intermediate amplifier stages may be included, such as optional power stage 16 coupled between input stage 12 and output stage 14. The system 10, as shown, comprises optical fiber amplifier (OFA), e.g., erbium doped fiber (EDF) amplifiers but, as is well understood by those in the art, these amplifier stages can be fibers doped with other rare earth dopants, such as Yb or co-doped, such as Er-Yb. The fibers comprising stages 12, 14 and 16 may be single mode fiber or double clad fiber with the pump sources coupled, respectively, into the fiber core or inner pump cladding as is well known in the art.

The input signal channels are connected via input connector 18, such as an APC connector. Connector 18 is coupled to WDM/isolator 20 to prevent feedback into the signal channels. WDA/isolator 20 is a commercially available product, and also provides for a small reflection signal feedback to monitoring diode 26. Isolator 20 is coupled to the input of fiber pre-amplifier stage 12. The output of stage 12 is coupled to WDM/isolator 22 and gain flattening filter 24, the output of which is coupled to the input of optional intermediate power fiber amplifier stage 16. The output of intermediate stage 16 is coupled to the input of power output stage 14. It should be understood that stages 14 and 16 are the same fiber and actually the same power fiber amplifier. One can, therefore, think of stage 16 as one portion of the power OFA and stage 14 as the other portion of the power OFA. Stage portion is pumped by pump power from the pre-amp OFA stage 12 via bypass 33 and stage portion 14 receives pump power via fiber 51 from coupler 50, as explained in more detail later.

Power output stage 14 is coupled to output connector 56, such as an APC connector, via WDM/isolator 26. WDM/isolator 26 also functions as a 1480/1550 band WDM coupler and via upgrade pump input connector 54A and fiber 55, provides for the addition of further pump power as illustrated in FIG. 3, which will be discussed later. Upgradable pump power from APC connector 54A is WDM combined at 26 to provide counter-propagating pump power to power amplifier stage 14. An output tap 37 is provided via fiber 29 to monitor the amplified output power via monitoring photodiode 28.

Reference is now made to branch-coupled pump laser sources 40A–40D which have optically coupled fiber pigtails 42A–42D and respective feedback fiber gratings 44A–44D in pigtails 42A–42D. These feedback gratings stabilize the pump power to a linewidth output within the absorption band of erbium around the wavelength of 980 nm. The feedback gratings also provide for low noise intensity operation as explained in U.S. Pat. Nos. 5,485,481 and 5,715,263, both of which are assigned to the same assignee as herein and are incorporated herein by their reference. FIG. 2 shows the output spectrum for pump sources 40A–40D which provides broadened bandwidths with peak wavelengths 41A–41D, due to the bandwidth of fiber gratings 44A–44D, causing laser sources 40A–40D to operate in the coherence collapse regime reducing source noise intensity below a level that is not readily discernible by fiber amplifier stages 12, 14 and 16. Pump sources respectively have peak wavelengths, as shown in FIG. 2, of 970 nm for source 40A, 980 nm for source 40B, 975 nm for source 40C, and 985 nm for source 40D. The two 10 nm separated sources 40A and 40B are WDM combined via 10 nm WDM fused tapered coupler 46A and the two 10 nm separated sources 40C and 40D are WDM combined via 10 nm WDM fused tapered coupler 46B. The combined pump signals are then combined by 5 nm WDM combiner 48, also which may be a fused tapered coupler. This paired tree WDM combiner is disclosed in U.S. application, entitled, "HIGH POWER FIBER GAIN MEDIA SYSTEM ACHIEVED THROUGH POWER SCALING VIA MULTIPLEXING", Ser. No. 08/955,883, filed Oct. 21, 1997, assigned to the assignee herein and incorporated herein by its reference. As can be seen with this configuration, N-1 couplers 48, 50 are required to multiplex N laser sources. The combined kink-free (no longitudinal mode hopping) pump power on fiber 49 is around 400 mW and is split 50/50 by coupler 50 with one portion via fiber 49, provided to 980/1550 band WDM coupler 30 for providing pump power to input pre-amp stage 12 and the other portion coupled into fiber 50 to 980/1550 band WDM coupler 36 for providing pump power to intermediate power amplifier stage 16 (counter-propagating to the signals) and to output power stage 12 (co-propagating with the signal signals). Fiber 51 is also coupled to upgrade power input APC connector 52A. Fibers 42, 49 and 51 are comprised of single mode fibers with WDM combiners 30 and 36 comprising fused bioncial couplers coupling a pump source single mode single mode coupling fiber 49, 51 and 55 to an OFA system comprising stages 12, 14 and 16 consisting of doped single mode fibers. It is possible, however, to employ rare earth double clad fiber for OFA stage 14.

Multistage amplifier system 10 provides for an all-fiber system that has connectorized fibers to allow extra 980 band and/or 1480 band pump power to be added to amplifier system 10. In absence of the upgraded power, the internally provided pumps that come with the basic amplifier system 10 fully drive all stages of the amplifiers to allow for normal system amplification. Pump upgrade modules can be provided for both co-propagating 980 nm band pumping and counter-propagating 1480 nm band pumping and can be accomplished in the field where the basic amplifier system has been installed by connecting the upgrade pump modules via standard fiber optic connectors 52A and 54A. Alternatively, the pump power upgrade modules may be fusion spliced directly to fibers 50 and 55.

An important aspect of this invention is the maintenance of the amplifier system inversion level, gain and gain profile which are strongly dependent on signal power to power ratio, particularly important to maintain as the system is upgraded to higher channel capacity with a corresponding increase in pump power. To achieve substantially the same signal to pump power ratio is important so that the GFF 24 remains effective with increased system power and channel capacity. This is accomplished by maintaining a constant inversion in pre-amp stage 12, keeping it as close as possible to being fully inverted, i.e., as close as possible to 100% inversion. A high inversion level can be maintained in stage 12 via a multiple pump source providing a combined output on fiber 49 which is split between pump input to stage 12 and pump input 14. The split in pump power should be such that input stage 12 is continuously maintained at a high inversion level. In the case here, the power split ration is 50/50, but other ratios could be equally applicable. This is accomplished by making stage 12 a short fiber amplifier, e.g., 10 meters or so, to insure that the stage remains fully inverted as possible. A longer fiber may permit inversion not to remain sufficiently high due to absorption. Excess pump power is not lost in the process but rather is efficiently used by launching it into the OFA stage 14 or 16, as the case may be.

Thus, an important feature of this invention is to keep pre-amp stage 12 substantially 100% inverted so that, upon upgrade of system power with system channel capacity, the gain and gain profile of the amplified channel signals as presented to GFF 24, upon system upgrade, will remain basically the same as in the original system configuration prior to making the system upgrade in channel capacity and pump power. In this regard, the use of pump power split coupler 50 is important since it permits a proportional amount of pump power increase from input connector 52A via coupler 50 to WDM 30 with increase in channel capacity and corresponding increase in signal power so that the signal power to pump power ratio of the basic system is substantially maintained. While coupler 50 is shown for splitting the pump power and permitting pump power upgrade, any other component capable of accepting increase pump power into system 10 from an upgrade source may be utilized in the practice of this invention.

The saturated output of an OFA is limited by the power available from the pump laser sources, such as base laser sources 40A–40D. Telecommunication system components are specified to have high reliability with specified lifetimes in excess of 25 years. As a result, only highly reliable pump lasers 40A–40D can be employed in the base amplifier system 10 as well as in upgrade systems using pump modules 60 or 80 shown in FIGS. 3 and 4. At the present time, the pump laser powers available from single laser diode sources is about 165 mW to about 320 mW for 980 nm laser diodes and about 150 mW from 1480 nm laser diodes. The maximum power available from these present power levels are not sufficient to drive fiber amplifiers with greater than 20 dBm output power. This is why is wavelength multiplexing, such as detailed in patent application Ser. No. 08/955,883, is employed to enhance the pump power levels, particularly with respect to 980 nm pump modules. However, the multiplexing of 1480 nm pump laser sources is a little different. Since 1480 nm laser diodes provide about 4% reflectivity from the uncoated output facets of these devices, they exhibit multi-wavelength emission with a mode spacing of approximately 0.5 nm. The standard fiber Bragg grating employed to stabilize 980 nm pump laser diodes cannot be employed in connection with 1480 nm pump laser diodes. Their grating reflectivity level, which is in the range of about 2% to 3%, is too low. Their reflection bandwidth of about 0.2 nm to 0.3 nm allows feedback from the grating to be with the nulls of the 1480 laser emission spectrum. Therefore, the fiber Bragg gratings for the 1480 nm stabilized laser sources have to be made wider in bandwidth, e.g., within the range of about 1.5 nm to 2.0 nm and with a higher reflectivity level of about 9% to 11%.

In FIG. 3 wavelength multiplexing of 1480 nm band laser diodes sources 62A–62D is shown for an upgrade pump module 60. These 1480 nm band laser diodes are pump sources, respectively, having peak wavelengths of 1470 nm for source 62A, 1480 nm for source 62B, 1465 nm for source 62C, and 1475 nm for source 62D. Laser sources 62A–62D include output coupled pigtails 64A–64D and respective feedback fiber gratings 66A–66D in pigtails 64A–64D. These feedback gratings 66A–66D stabilize the pump power to a broadened linewidth within the absorption band of erbium within the wavelength range about the erbium emission spectrum at 1480 nm. The feedback gratings also provide for low noise intensity operation in a manner as explained in U.S. Pat. Nos. 5,485,481 and 5,715,263, supra.

The two 10 nm separated sources 62A and 62B are WDM combined via 10 nm WDM fused coupler 68A and the two 10 nm separated sources 62C and 62D are WDM combined via 10 nm WDM fused coupler 68B. The combined 5 nm separated pump signals are then combined via 5 nm WDM combiner 70. As previously indicated, the paired branch WDM combiner arrangement is disclosed in detail in U.S. application, Ser. No. 08/955,883. The combined output of wavelength combined pump sources 62A–62D are provided, via fiber optic APC connector 54B, for coupling to fiber optic APC connector 54A of system 10 in FIG. 1. The combined output spectrum from pump module 60 presented as an output at APC connector 52B is shown in FIG. 6 with multimode operation about wavelength peaks 94, 95, 96 and 97, respectively, at 1465 nm, 1470 nm, 1475 nm, and 1460 nm.

The employment of wavelength multiplexing of pump laser diodes becomes impractical for pump powers in excess of 1 W. The wavelength spacing for eight to sixteen laser diode outputs WDM combined would to be too small to render the pump module reliable over long term use in telecommunication systems. FIG. 4 illustrates another 1480 upgrade pump module 80 that may be employed with system 10 of FIG. 1 where pump powers in excess of 1 W are necessary. Module 80 employs a cascade Raman resonator (CRR) source 88 of the type shown in U.S. Pat. No. 5,323,404, which patent is incorporated herein by its reference. The CRR source 88 must be reliable for this function and, so far, have not qualified for telecommunication use when employed with a standard higher power semiconductor laser array source as the pump source for the CRR. Higher reliability is achieved with the employment of multiple same linewidth (e.g., 915 nm), single, separately packaged semiconductor laser sources 82A–82D. The outputs of sources 82A–82D are coupled into respective multimode fibers 83 which are butt coupled into a single, large diameter multimode fiber 85 by forming the output ends of the multimode fibers 83 into a fused multimode fiber bundle coupler 84 as known in the art. The diameter of the larger diameter multimode fiber 85 is chosen to match the diameter of the inner pump cladding of a double clad Yb-doped fiber comprising fiber laser 86. Fiber laser 86 is fusion spliced to single mode fiber comprising CRR 88. Fiber laser 86 provides the proper single mode wavelength output power, e.g. 1117 nm, to drive the single mode fiber CRR source 88 which, with its cascaded fiber grating pairs, provides a final Raman shifted output around 1480 nm for coupling, via APC connector 54B to APC connector 54A in system 10 of FIG. 1.

The pump power upgrade 1480 band pump modules 60 and 80 shown in FIGS. 3 and 4, as well as comparable 980 nm band pump modules, can be applied directly in the field by connecting the upgrade pump modules via standard fiber optic connectors 52A and 54A; otherwise, the pump power upgrade modules may be fusion spliced, respectively, to fibers 50 and 55.

Thus, fiber amplifier system 10 is power upgradable, in a scaleable manner via the same WDM couplers 30, 26 and 36 of the basic amplifier system 10 of FIG. 1, with an external 980 band pump module similar in construction to module 60 shown for the 1480 nm sources in FIG. 3 (also disclosed in U.S. patent application, Ser. No. 08/955,883), and an external 1480 nm band pump module 60 or 80 shown respectively in FIGS. 3 or 4. A 980 nm band pump module coupled at APC connector 52A increases power proportionately to all OFA stages 12, 14 and 16 and, therefore, satisfies the scaling rules for maintaining erbium inversion levels and gain profiles with the adding additional pump power and channel capacity. However, the 1480 nm pump input must be isolated, via isolator 22, from the pre-amp stage 12 as the 1480 nm pump source will degrade the noise figure (NF) performance of stage 12. Thus, in multistage amplifier system 10, the 1480 nm pump power input affects only power amplifier stages 14 or 16 and the pumping level in pre-amp stage 12 is not affected. An important aspect of this invention is that the fiber length of pre-amplifier stage 12 is kept short, as previous explained, so that substantially full inversion is maintained in this OFA at all times. The power provided from the combined 980 nm band pump sources is kept sufficiently high to prevent the signal power from becoming strong enough in the pre-amp stage 12 to saturate the fiber. As illustrated in FIG. 1, fully half of the 980 nm band pump power is provided to the pre-amp stage 12 via coupler 50. A direct result of employing a short pre-amp fiber 12 together with excess 980 nm pump power is that most of this pump power is not absorbed in pre-amp OFA stage 12 and simply exits the fiber with the amplified signal. Tests have shown that as much as 75% of the pump power is unused and can significantly affect the power efficiency of the OFA. However, this is resolved by recycling the unused pump power by means of bypassing the unused pump directly to the power amplifier stages. As shown in FIG. 1, a 980 nm band/1550 nm band WDM coupler 32 is positioned at the output of pre-amp stage 12 to separate the unused 980 nm pump power from the channel signals. The channel signals proceed through isolator 22 and gain flattening filter 24 receiving signal conditioning while the 980 nm band pump power bypasses the signal conditioning of filter 24, via fiber 33, and is recombined via WDM coupler 34 into intermediate stage 16 or output stage 14, as the case may be, to provide additional pump power to the power amplifier stage.

In summary, multi-stage OFA's for DWDM systems 10 are designed for future upgradability compatible with a gain flattening filter inserted between the pre-amp and power-amp stages. All gain stages of system 10 are pumped with 980 nm light co-propagating with the signal. System 10 is made upgradable by configuring the power stage for an addition of 1480 nm light in a counter-propagating direction. A 36 nm bandwidth amplifier allows 22 channels with 200 GHz spacing, but will also allow 90 channels with a 50 GHz spacing. Assuming that each channel requires a constant output power of 5.0 dBm, a system upgrade from 22 channels to 90 channels would require an EDF amplifier power increase from 18.4 dBm to 24.5 dBm. Even greater channel power levels would be required if the channel output is divided for transmission over two or more fiber transmission paths. System 10 can be field upgraded to provide for these higher power levels as the channel capacity of system 10 is increased. The upgradable configuration of system 10 allows consumer purchase of lower capacity amplifier systems initially while providing field conversion to increased channel capacity and pump powers as the optical telecommunication needs of the end user increase.

An important aspect of this invention in multistage amplifier system 10 is the use of gain flattening filter (GFF) 24. Such filters are disclosed in the paper published by Paul F. Wysocki et al., entitled, "Broad-Band Erbium-Doped Fiber Amplifier Flattened Beyond 40 nm Using Long-Period Grating Filter", *IEEE Photonics Technology Letters*, Vol. 9(10), pp. 1343–1345, October, 1997, which paper is incorporated herein by its reference. WDM amplifier systems, such as system 10, require that the gain for each different channel, comprising a different wavelength signal, remains uniform. Since the wavelengths across the gains spectrum of the amplifier are not amplified all equally, some channel wavelengths will naturally be amplified at higher levels than others so that weaker amplifier signals through a multistage amplifier system, such as system 10, may be become lost in the system noise. The maximum gain deviation is commonly specified around 1.0 dB. Since the unaltered gain profile of an erbium doped silica based fiber does not meet this requirement, the gain flattening filter (GFF) is employed. GFF 24 provides wavelength dependent loss along the wavelength gain spectrum of the chosen rare earth doped fiber to provide for a flatten gain profile across the gain spectrum of the amplifier or amplifiers. The maximum attenuation of the GFF 24 is directly related to the differential between the highest and lowest gain values in an unaltered fiber amplifier. The gain differential varies greatly depending on the length of the OFA, signal power levels and pump power levels. While a gain flattening filter can be designed to compensate for a wide variety of gain differentials, the loss caused by the GFF 24 must remain significantly less than the gain in the pre-amp stage 12 or the noise figure will suffer in that stage. In this invention, the attenuation of GFF 24 is minimized by the provision of an EDF amplifier wherein the two primary peak gain features of the emission or gain profile at 1532 nm and 1555 nm are sufficiently close to have equal gain as compared to the case of an unfiltered fiber amplifier configuration. This allows the filter to be designed with the lowest possible loss and, therefore, there is a minimal degradation of the noise figure in system 10. FIG. 5 illustrates the typical attenuation profile 90 for the signal exiting the pre-amp stage 12 with attenuation peaks at 92 (1532 nm) and 93 (1555 nm) which profile is substantially the antithesis of the emission spectrum of the erbium doped silica fiber. To be noted is that peak values 92 and 93 are of similar magnitude and, as shown in FIG. 5, the peak attenuation is maintained below 5 dB.

GFF 24 is presently made by employing long period gratings. To be noted is that with respect to attenuation peak 92, it is much steeper profile compared to attenuation peak 93. In fabricating a long period grating, it is difficult to precisely follow the gain emission profile. With respect to the more narrow peak 92, differences between the gain and attenuated points for a given wavelength about the wavelength 1530 nm will be significantly greater compared to that for a given wavelength about the broader peak 93, e.g., a wavelength about the wavelength 1550 nm. This is because the attenuation (or in the case of the gain profile) to wavelength slope change is much higher for the narrower peak 92 compared to the broader peak 93. It is easier to form the grating for a broader based curve 93 than a more narrower curve 92 and suffer less difference between the gain emission profile and the attenuation profile of filter 24. Thus, an alternative approach is to attenuate peak 92 by making the fiber in stage 12 longer so that the power absorption occurs more at higher wavelengths. The longer fiber renders the gain inversion lower so that power that would be normally absorbed at peak 92 is, it is believed, reabsorbed at higher wavelengths in the gain band providing a profile with a broader gain spectrum relative to a broader gain peak which is easier to fit with a broader attenuation profile with peak 93A as shown in FIG. 5A. As a result, it is easier to fabricate a long period grating that results in less differences between the gain profile of OFA 12 and the attenuation profile of GFF 24. With the longer fiber in OFA 12, the pump power may be adjusted accordingly to maintain its high gain inversion.

The following example is provided of a system made according to the embodiment of FIG. 1.

A system 10 was employed as pumped by four wavelength stabilized pump lasers 40A–40D available from SDL, Inc., San Jose, Calif., such as part number SDLO-2000, with wavelengths $\lambda$=970, 975, 980 and 985 nm. After 5 nm WDM combiner 48, the pump power available in single mode fiber 49 was 419 mW. Two different systems based upon system 10 of FIG. 1 were employed to provide the pump power upgrades. The first system was the upgrade pump module 60 shown in FIG. 3 with four wavelength multiplexed pumps of wavelengths of $\lambda$=1465, 1470, 1475, and 1480. The single mode power provided by module 60 was 55 mW with the output spectrum as shown in FIG. 2. The second system is the upgrade pump module 80 shown in FIG. 4, which provides higher pump power than the first system of FIG. 3, was driven by four high reliability 915 nm multimode diodes 82A–82D each providing over 1 W of pump power (part number SDLO-4000 available from SDL, Inc., San Jose, Calif.). The combined output of pump lasers 82A–82D drives Yb-doped fiber laser 86 and CRR 88 providing a pump output at connector 54B of 1050 mW at $\lambda$=1478 in a single mode fiber. The power conversion efficiency from 915 nm to 1480 nm band was about 23%.

The base fiber amplifier system 10 (without use of optional fiber amplifier 16) provided total output power of 21.2 dBm at 56 when operating with 419 mW pump power at $\lambda$=978±8 nm. When system 10 is upgraded with the addition of module 60, providing an additional pump power of 355 mW at $\lambda$=1473±8 nm, output power at 56 was increased to 25.3 dBm. When system 10 is upgraded with the CRR upgrade module 80, providing an additional pump power of 1050 mW at $\lambda$=1478 nm, output power at 56 was increased to 28.6 dBm. This power level will support 229 optical channels at 5.0 dBm each.

Gain flatness for each output power level was measured using a fiber-coupled broadband LED in the presence of three saturating probes of equal power ($\lambda$=1530 nm, 1540 nm, and 1555 nm). Input powers were adjusted to maintain a 25 dB gain condition. FIG. 7 shows gain flatness measurements at the original base and upgraded power systems, i.e., system 10 as shown in FIG. 1 without optional amplifier 16 at curve 100, the same system 10 upgraded with pump power module 60 at curve 102, and the same system 10 upgraded with the pump power module 80 at curve 104. As can be seen from FIG. 7, the gain flatness over 36 nm (approximately from 1528 nm to 1564 nm) is 1.1, 1.2 and 1.3 dB for output powers of 21.2, 25.3, and 28.6 dBm, respectively. The similarity in maintained gain flatness indicates that the erbium inversion levels in all amplifier stages did not significantly change even though the signal through the amplifier was increased by a factor of five. Furthermore, since the shape of the gain profile does not change with increased pump power, the gain flatness can be reduced to below 0.5 dB with further optimization of the GFF 24.

The noise figure was measured over all wavelengths using the time-domain extinction method on an BP-71452B optical spectrum analyzer. The maximum noise figures over the 36 nm gain flattened bandwidth were 5.0, 5.3, and 5.9 dB at output powers of 21.2, 25.3, and 28.6 dBm, respectively. The increase in noise figure is due to the decrease in gain in input stage 12 that occurs when the input signal power is increased while the pump power remains constant.

Table 1 below summarizes the output power, gain flatness and noise figure results for system 10 in three different tested configurations. This data supports that high capacity OFA's, in particular EDF amplifiers, for DWDM applications can be designed to be reliable as well as gain flattened and pump power upgradable without redesign of the system or changing of the gain flattening filter, and reaching high output channel power through the use of efficient pump configurations providing intense single mode pump powers at both 980 nm and 1480 nm.

TABLE 1

| 978 ± 8nm Wavelength Multiplexed Pump | 1473 ± 8 nm Wavelength Multiplexed Pump | 1478 nm Cascaded Raman Resonator | EDFA Output | Gain Flatness | Noise FIG. |
|---|---|---|---|---|---|
| 419 mW | — | — | 21.2 dBm | 1.1 dB | 5.0 dB |
| 419 mW | 355 mW | — | 25.3 dBm | 1.2 dB | 5.3 dB |
| 419 mW | — | 1050 mW | 28.6 dBm | 1.2 dB | 5.9 dB |

Reference is made to FIG. 8 and multistage amplifier system 10A including the employment of a dispersion compensating module (DCM) 114 comprising a dispersion compensating fiber 115. System 10A is substantially the same as system 10 of FIG. 1 where like components in system 10A carry the same numerical identification as found in FIG. 1 so that the description of these components will not be repeated here. The differences, however, are that three WDM combined co-propagating and counter-propagating pump lasers sources 40A–40C and sources 62A–62C, respectively, are utilized and the counter-propagating group is fused to single mode fiber 52. This counter propagating group includes connecterized sources via connectors 61A–61C as disclosed in U.S. patent application Ser. No. 08/955,883, supra, to provide for their later placement or replacement in the field. In this embodiment, system 10A may be installed as shown without pump laser sources 62A–66C but integrated with stabilizing fiber gratings 66A–66C, WDM couplers 68 and 70 and fiber 52 coupled to WDM/isolator 26. When the time arrives for system upgrade, pump lasers 62A–62C can be installed in the filed via connectors 61A–61C. Taps at 27 and 29 are photodiode coupling to monitor the system. T-drop tap 21 and T-add tap 39 are for external temperature current monitoring of system 10A. As is known, system 10A, may be temperature controlled with a cooler provided in its package. Also, shown in FIG. 8 are fiber fused splices of fibers to form the all-fiber multi-stage amplifier system 10A.

The principal difference of system 10A of FIG. 8 from system 10 in FIG. 1 is the inclusion of DCM 114 in the system. DCM 114 provides for cleanup of dispersion effects on the channel signals due to signal propagation over the pervious fiber communication link. DCM 114 is releasably connected, via APC connector pairs 112A, 112B; 116A, 116B, to system 10A, different systems 10A can be provided with appropriate dispersion compensating fiber of appropriate length.

System 10A may also includes a Raman filter 110 to adjust and control the gain tilt of the channel signals. Also, an isolator 118 may be include to isolate the element from the final output stage 14.

As indicated previously, attenuating gain flattening filter 24 in system 10 of FIG. 1 equalizes the gain over the require bandwidth operation of system 10, as illustrated in FIG. 5. Once an amplifier configuration for system 10 as well as filter 24 have been properly chosen, system 10 will be capable of gain flatten operation with a fixed internal gain that is dependent on the gain of the doped fiber and the length of the gain fiber. Unfortunately, however, an important factor in amplifier usage in an optical network is the external gain of the system, which will be lower that the internal gain due to connector losses, internal component losses, and internal splice losses and other such insertion losses. Since these values will be different for each amplifier system, the external gain will be different for different manufactured amplifier systems. Even if the optical network design allows for external gain variation among the amplifiers used in the system, each gain flattening filter design is only capable of optimal operation at a single internal gain setting. There is a need for amplifiers with a wide range of gains, such as from 15 dB to 35 dB, but each individually designed filter for each amplifier system would provide added cost to each manufactured system while taking time (presently months) to achieve their individual fabrication.

It is therefore, desirable to have a design which allows a wide variation in setting of the external gain configurations of systems 10 while using the same filter design, i.e., a means of employing a single gain flattening filter design to fabricate amplifiers with a wide range of external gain values, while providing the ability to precisely set the value for the external gain of the system. This is accomplished by designing a filter 24 having a gain value higher than that required to produce the desired external gain and include, in addition, in system 10 an insertion loss element or apparatus capable of setting or adjusting the external gain to a predetermined gain level. Once system 10 is assembled, the external gain condition is monitored while simultaneously creating a controlled internal loss. If properly positioned, the internal loss will lower the external gain condition as desired without significantly affecting system noise or signal output power. The gain can be adjusted by 5 dB or more with a small effect on gain uniformity.

Inducing internal loss may be achieved with the apparatus shown in FIGS. 9 and 10. This apparatus provides microbending losses to the system fiber between the input and output stages 12 and 14, preferably immediately before the output stage 14. These insertion loss apparatus are inexpensive, provide for easy adjustment to provide a set desired amount of insertion loss, with adjustment and adjustment set easily performed in a high production environment. Two different approaches are illustrated in the apparatus of FIGS. 9 and 10. In both cases, loss is induced by placing the system fiber in a track which may be built into the fiber tray supporting system 10A and providing a microbend to the fiber which, after achieving the desired loss adjustment, can then be fixed in place. In FIG. 9, insertion loss apparatus 120 provides for fiber microbending loss through the use of a set screw 126. Set screw 126 is secured in an edge of the amplifier system fiber tray 124. A fiber support member 128 holds fiber 122 in a secure position relative to fiber tray 124. Fiber 122 may be the input end of fiber 14 or another fiber fuse spliced to fiber 14. The attenuation level of optical loss is adjusted by turning set screw 126 inwardly or outwardly relative to tray 124 to respectively increase or decrease the amount of bending to form loop 127 in fiber 122 and, correspondingly, increase or decrease the insertion loss. Apparatus 120 has been employed to adjust the flat gain condition of system 10A by as much as 4.5 dB to meet the precise requirements of end user desired gain conditions.

As shown in FIG. 10, insertion loss apparatus 130 provides for fiber microbending loss through the use of an external tool or fixture 133 and epoxy 135. A fiber support member 138 holds fiber 132 in a secure position relative to fiber tray 134. Fiber 132 may be the input end of fiber 14 or another fiber fuse spliced to fiber 14. The attenuation level of optical loss is adjusted by adjusting the amount of microbend in fiber loop 137 by means of tool 133. When the desired adjustment in loss is achieved, epoxy 135 is applied to maintain the position and amount of bend in loop 137 firmly fixed in position.

Obviously, there are other mechanisms that would be obvious to those skilled in the art, upon observing FIGS. 9 and 10, to induce adjustable bending losses to the fiber.

An important aspect of this feature of the invention is that the fibers 122 and 132 exit the microbend loss apparatus 120 and 130 at the same angle as the fiber 122 and 132 enters the apparatus. Experiments have shown that if the microbend is not uniform from entrance to exit of the apparatus, a undesirable polarization dependent loss (PDL) can be induced by the microbend. Such induced PDL can be made insignificant if the entrance and exit bends of microbend loops 127 and 137 made to the fiber 122 and 132 are reciprocal, i.e., identical in length and curvature.

Other important features of microbend loss apparatus 120 and 130 is that they are inexpensive to implement, require no spicing into the system fiber, and are easy to manufacture and adjust in a manufacturing environment.

FIG. 11 illustrates gain flatness modeling results of system 10A. In FIG. 11, four saturated gain tones are illustrated at $\lambda$=1530, 1540, 1550, and 1560 nm. The gain spectrum is shown respectively for a 20 channel based system with 17.1 dBm output power at 140 (system 10A without the counter-propagating pumping group 62A–62C), and for a fully upgraded 80 channel system with 23.0 dBm output power as illustrated in system 10A in FIG. 8. In both cases, gain flatness is about 0.27 dB. Thus, the amplifier system and the gain flattening filter can be specifically designed to optimize gain flatness at both the base system with 3×975±3 nm pump lasers in the 20 channel version as well as a fully pumped system shown in FIG. 8 with 3×975±3 nm pump lasers and 1475±5 nm pump lasers in the 80 channel version with a noise figure of about 5.5 dB over the entire wavelength band of operation.

In summary, multi-stage amplifier systems 10 and 10A provide simplified designs for upgrading pump power existing systems with increased channel loading while maintaining constant output power per channel. Superior gain flatness in these forward-looking amplifier systems is achieved through the combination of:

Multiple rare earth doped stages with an input stage pre-amplifier and an output stage power amplifier with hybridizing of the two fiber amplifiers to provide an optimum compromise of low noise figure and high output power.

Gain flattening filter positioned between the input and output fiber stages that compensates for the inherent non-flatness of the gain in the rare earth doped fiber by introducing an appropriately designed wavelength dependent loss to achieve gain equalization across the useful gain spectrum. The filter is made by cascading several discrete long period gratings in a fiber portion having varying peak losses and bandwidth to form the antithesis of the inherent non-flat gain spectrum of the rear earth doped fiber. The filter placement between input and output stages results in the best compromise between noise figure and power output. The attenuation of the filter is minimized by providing gain peaks of the filter gain profile to be substantially equal to one another in magnitude.

Insertion of an isolator between the input and out amplifier stages prevents backward ASE from depleting the gain of the input amplifier stage thereby preserving its high gain and resulting in lowest noise figure and predetermined gain flatness.

An appropriate choice of rare earth fiber length within the input and output fiber amplifier stages enabling synthesis of the gain flattening filter with readily available components and resulting in a predetermined and some tunability to the amplifier gain flatness.

Provision of higher internal gain in the system with an insertion loss element or apparatus in the system to provide properly designed or adjusted internal gain losses to achieve uniform external output gain over a plurality of manufactured multistage amplifier systems.

Although the invention has been described in conjunction with one or more preferred embodiments, it will be apparent to those skilled in the art that other alternatives, variations and modifications will be apparent in light of the foregoing description as being within the spirit and scope of the invention. Thus, the invention described herein is intended to embrace all such alternatives, variations and modifications that are within the spirit and scope of the following claims.

What is claimed is:

1. A multistage fiber amplifier system comprising:
   an input amplifier stage and an output amplifier stage each comprised of a rare earth doped fiber and each having an inherent gain profile over a given gain spectrum, said input amplifier stage receiving an input comprising a plurality of channel signals for amplification and together having a given input signal power;
   a first plurality of pump laser sources with outputs combined for providing pump power to said input and output amplifier stages;
   the combined pump outputs being split to pump the input and output amplifier stages; and
   upgradable pumping power provided to said input amplifier stage and said output amplifier stage to increase the pump power to said amplifier stages for maintaining the rare earth inversion levels and gain profiles in said amplifier stages when said input signal power to said input amplifier stage is increased or when an amount of signal channels provided to said input amplifier stage is increased.

2. The multistage fiber amplifier system of claim 1 further comprising an optical coupler for splitting the combined pump power between said input and output amplifier stages, one portion of said pump power provided as an input to said input amplifier stage and the other portion of said pump power provided as an input to said output amplifier stage.

3. The multistage fiber amplifier system of claim 1 further comprising an optical coupler for splitting the combined pump power between said input and output amplifier stages, one portion of said pump power provided as an input to said input amplifier stage and the other portion of said pump power provided as an input to said output amplifier stage such that the total power delivered to said input amplifier stage is higher than the combined signal power of said channel signals and continually maintains said input amplifier stage in a high inversion state.

4. The multistage fiber amplifier system of claim 1 further comprising a second plurality of pump laser sources for providing said upgradable pumping power.

5. The multistage fiber amplifier system of claim 4 wherein said second plurality of pump laser sources are coupled into the multistage fiber amplifier system after the initial installation of the system.

6. The multistage fiber amplifier system of claim 1 wherein approximately half of the pump power of said first plurality of pump laser sources is provided to said input amplifier stage.

7. The multistage fiber amplifier system of claim 1 wherein the pump power from said first plurality of pump laser sources is split between said input and output amplifier stages via an optical coupler in a ratio other than 50/50.

8. The multistage fiber amplifier system of claim 1 wherein the pump power from said first plurality of pump laser sources is split to provide more pump power to the output amplifier stage and the input power to said input amplifier stage is sufficient to maintain the stage at a high inversion level through the employment of a short length of rare earth doped fiber.

9. The multistage fiber amplifier system of claim 1 wherein said input amplifier stage is maintained at a high inversion level through the employment of a short length of doped fiber with excess pump power from the input amplifier stage being launched into the output amplifier stage.

10. The multistage fiber amplifier system of claim 1 further comprising a gain flattening filter between said input amplifier stage and said output amplifier stage to render the gain profile uniform over the given gain spectrum of said input amplifier stage based upon the channel signal input.

11. The multistage fiber amplifier system of claim 10 further comprising a pump light bypass fiber coupled between said input and output amplifier stages bypassing said filter to directly couple excess pump light from said input amplifier directly into said output amplifier stage.

12. The multistage fiber amplifier system of claim 1 wherein said pump power to said input and output amplifier stages is upgradable via an input connector coupled between said first plurality of pump laser sources and said input and output amplifier stages.

13. The multistage fiber amplifier system of claim 12 wherein said pump power to said output amplifier stage is upgradable via another input connector coupled to an output of said output amplifier stage to provide counter propagating pump power in said output amplifier stage.

14. The multistage fiber amplifier system of claim 1 wherein excess pump power provided to said input amplifier stage is launched into said output amplifier stage.

15. The multistage fiber amplifier system of 1 wherein excess pump power provided to said input amplifier stage is launched into a first portion of said output amplifier stage and a second portion of said output amplifier stage is provided with pump power via said pump split to pump the input and output amplifier stages.

16. The multistage fiber amplifier system of claim 14 wherein said output amplifier stage first portion comprises an intermediate amplifier stage in the multistage fiber amplifier system.

* * * * *